United States Patent [19]

Timberlake et al.

[11] 4,126,275
[45] Nov. 21, 1978

[54] PROCESS FOR SIZING AND DESLIMING OF ORE MATRIX

[75] Inventors: Richard C. Timberlake; U. K. Custred, both of Lakeland, Fla.

[73] Assignee: American Cyanamid Company, Stamford, Conn.

[21] Appl. No.: 816,430

[22] Filed: Jul. 18, 1977

[51] Int. Cl.² ............................................. B02C 23/10
[52] U.S. Cl. .......................................... 241/1; 241/21; 241/24; 241/25
[58] Field of Search ...................... 241/1, 3, 15, 21, 24, 241/25, 30, 301

[56] References Cited

U.S. PATENT DOCUMENTS

| 2,164,052 | 6/1939 | Bullwinkel | 241/14 |
| 2,546,247 | 3/1951 | Wolf | 241/24 |
| 3,204,877 | 9/1965 | Barr, Jr. et al. | 241/1 |
| 4,044,107 | 8/1977 | Houghtaling | 241/21 |

Primary Examiner—Granville Y. Custer, Jr.
Attorney, Agent, or Firm—Gordon L. Hart

[57] ABSTRACT

A method of processing hydraulically mined ore slurries containing, in addition to the valuable ore, substantial quantities of contaminating argillaceous material and silica, involving initially separating the argillaceous material from the ore slurry while concomitantly concentrating said slurry to at least 65% solids content, depositing the wet concentrate thus formed on a continuous belt and conveying said wet concentrate via said belt to a beneficiation plant for further treatment.

8 Claims, 6 Drawing Figures

PROCESS FOR SIZING AND DESLIMING OF ORE MATRIX

BACKGROUND OF THE INVENTION

The phosphate rock industry is an outstanding example of industrial and ecological achievement through the use of modern mining techniques, improved ore dressing methods and novel ecologically oriented practices.

New developments in each of these areas has resulted in increased output and recovery of the vital mineral product from the mineral deposit, marked extension of the life of the phosphate fields and conservation of water resources through recycle. The improved practices have also resulted in elimination or minimization of land and water pollution hazards normally associated with disposal of waste slimes produced in ore processing plants and in the reclamation of otherwise useless land by formulating waste slimes and tails into a reconstituted fertile soil having acceptable bearing strength. Processes for achieving these desirable results are described in U.S. Pat. to C. C. Cook and E. M. Haynsworth, No. 3,718,003; No. 3,763,041 and No. 3,761,239, issued Feb. 27, Oct. 2 and Sep. 25, 1973, respectively, and M. L. Lassiter, No. 3,940,071, issued Feb. 24, 1976.

The benefits derived from these improved practices are dramatic and accrue to both the industry and the public alike. However, these benefits are not derived without (a) utilization of additional equipment, (b) an increase in the labor force required to install, operate and maintain said equipment, and (c) a marked increase in power consumption.

Now, in light of diminishing fuel reserves, skyrocketing costs for electrical energy and significantly increasing equipment costs, especially for large diameter steel pipe required by the modern practices for moving high pressure water, tailing, slimes and matrix between the mine, the phosphate recovery plant and the waste disposal area, it becomes exceedingly apparent that still further technological advances are required to achieve the desirable results afforded by the above-mentioned practices; but, to achieve such results with greatly reduced power consumption and minimized equipment and labor costs.

The magnitude of the problems confronting the industry, as regards increasing energy costs and usage of large diameter steel pipe is evidenced by the fact that energy costs for a typical modern phosphate mining operation have nearly quadrupled in the past five years; and further, by the fact that such an operation will normally require replacement of approximately 20,000 to 30,000 feet of large diameter, i.e. 16 to 20 inches, steel pipe annually.

It is, therefore, an object of the present invention to provide an improved method and apparatus for processing hydraulically mined ore slurries, particularly phosphatic ore slurries, whereby power consumption per ton of ore processed is markedly reduced.

It is also an object of this invention to eliminate or minimize pipe errosion and maintenance problems encountered in the conventional processing of hydraulically mined ore slurries by replacing the slurry pump transport of matrix and plant tailings with an endless belt conveyor system.

It is a further object of this invention to provide a method for processing matrix slurries, wherein said matrix slurries are dewatered and deslimed at or near the active mining operation such that pumping of the matrix slurry over extended distances is eliminated.

It is a still further object of this invention to provide a method for transporting wet, deslimed, phosphate matrix from an active mining operation to an ore dressing plant via a continuous belt, while simultaneously transporting tailings from the ore dressing plant for use at a land reclamation excavation, near or adjacent the active mining operation, using the same said continuous belt.

SUMMARY OF THE INVENTION

This invention relates to a method of processing hydraulically mined ore slurries, containing in addition to the mineral values, substantial quantities of contaminating argillaceous material (clay) and silica.

Among the ores which can be processed in accordance with the method of the present invention are non-metallic ores such as phosphate, potash, feldspar, clays and fluorspar, and metallic ores such as titanium and rutile. For the purpose of clarity, it is most convenient to describe this invention in terms of a particular ore processing industry, such as the phosphate industry, although the present process is not necessarily limited to the processing of phosphate ore.

In the surface mining of phosphate ores over-burden covering the phosphate rock is removed by any convenient means, as for example with a dragline, bulldozer, steamshovel, or the like. The phosphate bearing ore comprising, argillaceous material (clay), quartz or silica, mineral values and extraneous gangue, is then dug from the deposit, generally with a dragline, and deposited as a mound of loosely consolidated ore matrix in front of a pit gun car. Hydraulic pit guns, mounted on the car, are used to direct streams of high pressure water at the matrix forming it into a slurry.

According to the invention, this matrix slurry is pumped to slurry treatment apparatus at an intermediate station where it is sized, deslimed, dewatered and deposited on an endless belt for transport to the phosphate ore dressing plant for further refining.

In contrast to the typical phosphate mining operation, desliming at a station near the pits can reduce the volume of materials handling by as much as 100 to 300 tons per hour.

The term, intermediate station, as used herein, is intended to mean those parts of the treating and transport apparatus located in the vicinity of the active mining pits for concentrating solids from the matrix slurry for transport by conveyor belt to a more remote processing plant, and for reslurrying the return tailings. This arrangement is a total departure from conventional practices. Similarly, the location of waste disposal areas near or adjacent the active mining operation is another recent departure from conventional phosphate mining practices. This latter arrangement is particularly advantageous in conjunction with the present invention, since it provides for waste disposal of slimes with minimized transport and requires little, if any, additional electric power.

In a preferred operation, the intermediate station is situated where the slimes can be delivered from the intermediate station to the disposal area by gravitational flow. Depending on the terrain in which the mining is carried out, in some cases some pumping facilities may be required for moving slimes to the waste disposal area.

Yet another departure from conventional phosphate mining practices is the use of an endless belt to convey dewatered and deslimed matrix over a long distance from the intermediate station to the phosphate recovery plant. This arrangement reduces power consumption and eliminates many problems formerly associated with the maintenance and replacement of the slurry pumps and the long distance, large diameter pipelines used to deliver matrix slurry from the mines directly to the ore dressing plant. In addition, in a preferred practice of the present invention, dewatered sand tailings from the ore dressing plant are deposited on the returning strand of the continuous belt and carried to the intermediate station near the disposal area where the tailings are slurried and transported by a slurry pipeline over the short distance to the disposal area. The sand tailings slurry is sprayed over thickened slimes in the disposal area.

The invention in some preferred embodiments thus combines an improved method for transporting and processing the ore matrix with improvements in a continuous land reclamation method.

DESCRIPTION OF THE PREFERRED EMBODIMENTS

Figure 1:
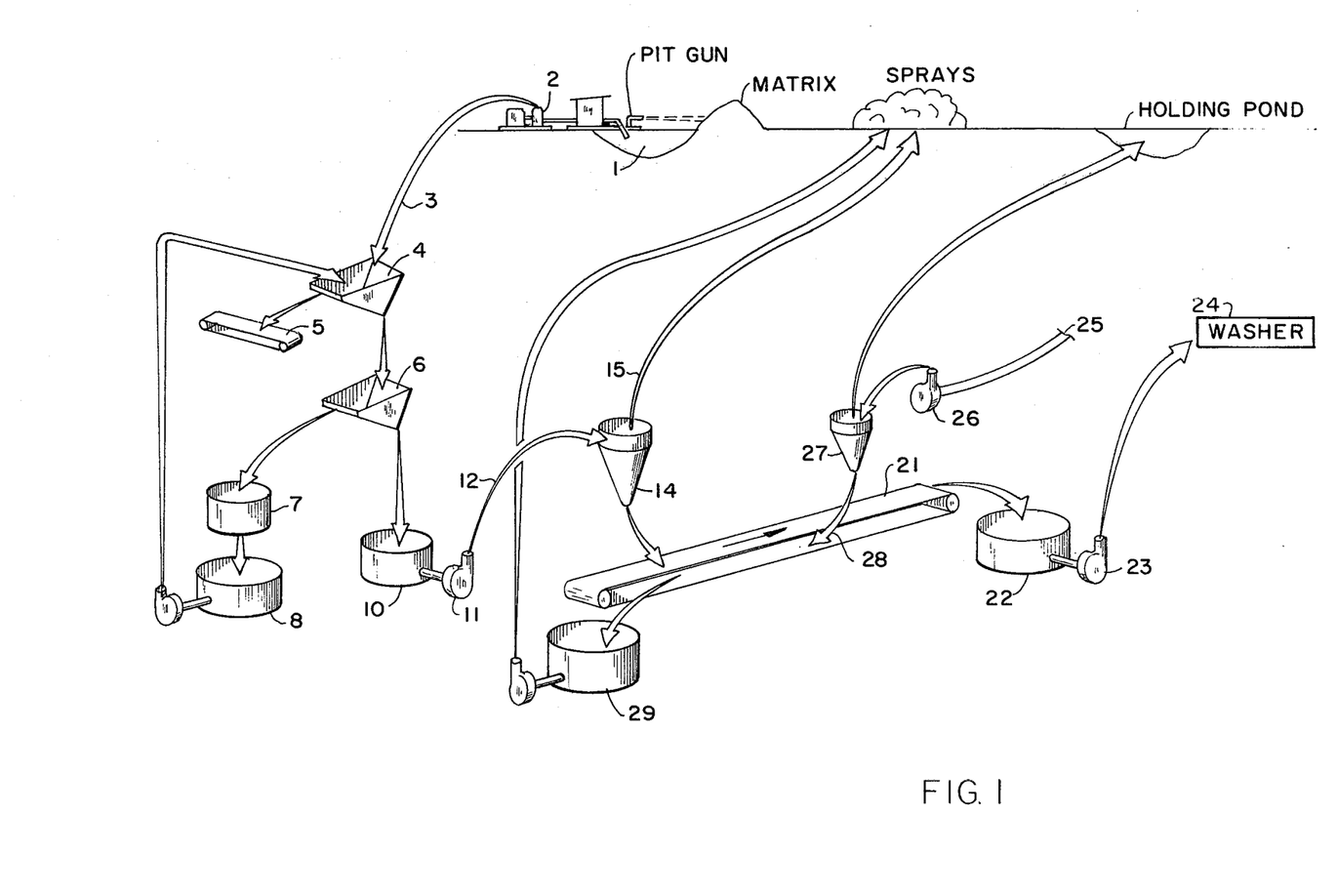
FIG. 1 is a diagrammatic sketch of a preferred process of this invention.

Now referring to FIG. 1, a stream of high pressure water is directed at a loosely consolidated mound of phosphate matrix. The stream washes the matrix into a sump 1 from which the slurried matrix, containing approximately 35% solids, is withdrawn by means of pit pumps 2.

The slurry is pumped over a short distance under high pressure through a large diameter pipe 3 to an intermediate station which is relatively nearer to the mine than the ore processing plant. The slurry is delivered first to a grizzly 4 where plus 3-inch materials such as rocks, mudballs and extraneous gangue, are removed. The plus 3-inch waste from the grizzly is deposited on a waste conveyor 5 and sent to a waste disposal area where it becomes a constituent in the continuous land reclamation process.

Alternatively, where the plus 3-inch material from the grizzly 4 is primarily compacted clay (mudballs) containing entrapped phosphate values, said mudballs can be slurried in water to about 60% to 80% solids by weight and subjected to jets or streams of high pressure water, preferably in the 125 to 175 psig. range. The mudballs are disintegrated by the high velocity jets, not shown, and the slurry is recycled to the grizzly for further treatment.

Another alternative to the disposal of plus 3-inch mudballs is the use of ultrasonic waves to disintegrate the mudballs (not shown). In this alternative method of treatment, the mudballs from grizzly 4 are slurried to about 20% to 40% solids by weight and the slurry is subjected to sonic waves in a frequency range of about 75 to 100 cycles per second. The thus-treated slurry is then recycled to the grizzly 4 for further treatment.

Minus 3-inch material passing the grizzly 4 is deposited on a ¾-inch screen 6 to separate minus 3-inch plus ¾-inch matrix from the minus ¾-inch matrix slurry which is used as cyclone feed.

The minus 3-inch plus ¾-inch matrix from screen 6 is then crushed to pass through the ¾-inch screens. While the crusher 7 is shown as an impactor, other types of crushers, such as hammer or rodmills, can be used to reduce this minus 3-inch plus ¾-inch matrix fraction to the desired minus ¾-inch particle size.

Crushed product from the impactor 7 is deposited in a slurry holding tank 8, equipped with an agitator, not shown, for dispersing and maintaining the crushed product in a slurry. This slurry is recycled by pump means 9 to the 3-inch grizzly 4.

The minus ¾-inch slurry which passes the screen 6 is sent to a matrix slurry holding tank 10, where the solids concentration of the matrix slurry is adjusted to about 20% to 30% solid, and preferably to about 25% solids. In practice, we have found that slurries having a solids concentration below about 20% generally result in excessive deposition of water on the belt due to inadequate cyclone separation. Likewise, slurries having more than about 30% solids concentration do not lend themselves to cyclone desliming, but rather, yield a matrix contaminated with excessive slimes.

The term, "slimes," as used herein, refers to aqueous suspensions or dispersions of ultrafine solid wastes most of which are ordinarily separated from the ore feed stream prior to the flotation step. More particularly, slimes are the ultrafine soil solids associated with the ore such as; for example, clays, quartz, and mineral values, the solid particles of which are of sufficiently small particle size so that at least about 99% by weight of the solids (dry basis) passes through a 150-mesh screen.

The matrix slurry containing 20% to 30% solids is withdrawn from holding tank (10), where solids are kept in suspension by constant agitation, and pumped by pump means 11 through conduit 12 to a high pressure super cyclone 14. The super cyclone is a 48-inch cyclone which is operated at feed pressures in the range of from 50 psig. to 80 psig., to prevent or inhibit losses of 150-mesh phosphate particles and maintain the percent solids in the overflow from said cyclones below 10% solids at about 50 psig. or below about 12% at 70 psig.

In the present process, overflow from cyclone 14 is generally discharged under pressure which may be sufficient to move the slimes through pipeline to the settling area without additional pump support. Location of the waste disposal area adjacent to or near the active mining operation and the use of piping arrangements which utilize gravitational forces help to achieve disposal of the slimes with minimum equipment and little, if any, additional electrical power.

The underflow from cyclone 14 is a dewatered-deslimed matrix having a solids concentration in excess of 65%. This dewatered-deslimed matrix is deposited wet upon a continuous belt 21 and transported on the belt to a matrix reslurry tank 22 located in the immediate vicinity of the ore dressing plant.

When the continuous belt is operated over extended distances and over terrain wherein the belt 21 is necessarily inclined or declined about 2° or more from level for a distance of several hundred feet or more, it is critical to dewater the matrix to at least 65% solids, and preferably to 75% solids concentration. It has been found that matrix having 65% or more solids can be successfully carried up to 2° to 3° grades for extended distances. However, when the solids content is reduced below about 65% and the wet matrix is transported under the stated conditions, washouts of the matrix on the belt can occur. Lower solids concentration in the wet matrix might be tolerated when the belt is operated over level terrain.

To deal with dewatering of the deslimed matrix on the belt 21, we have found it advantageous to flatten the belt at several locations, preferably on level terrain, along the transport route. This procedure permits any accumulation of water separated from the matrix to drain from the belt at sites where said belt is flattened.

Reslurried matrix from holding tank 22 is pumped by pump means 23 to the washer 24, the first stage of a conventional ore dressing process in which the deslimed matrix is washed, sized by screening, scrubbed, dewatered, conditioned and subjected to a flotation treatment where sand tailings are separated from the mineral values.

In accordance with the present process, a slurry of tailings 25 from the flotation treatment, is pumped by pump means 26 to a cyclone 27 where water is removed and recycled to the plant water holding pond. Dewatered tailings 28 from cyclone 27 are deposited on the returning strand of the continuous belt 21 and transported by belt 21 to a tails reslurry tank 29 at the intermediate station.

This arrangement reduces horsepower requirements for transport of both ore and tailings by a more efficient system and combines tails and matrix conveying into one unit. Reslurried tails from holding tank 29 are pumped by pump means to the waste disposal area where the slurry is sprayed over slimes which have settled to a solids concentration of from 10% to 25% solids.

Continuous land reclamation is thus achieved in accordance with the processes of the above-mentioned Cook et al. and Lassiter Patents.

Figure 2:
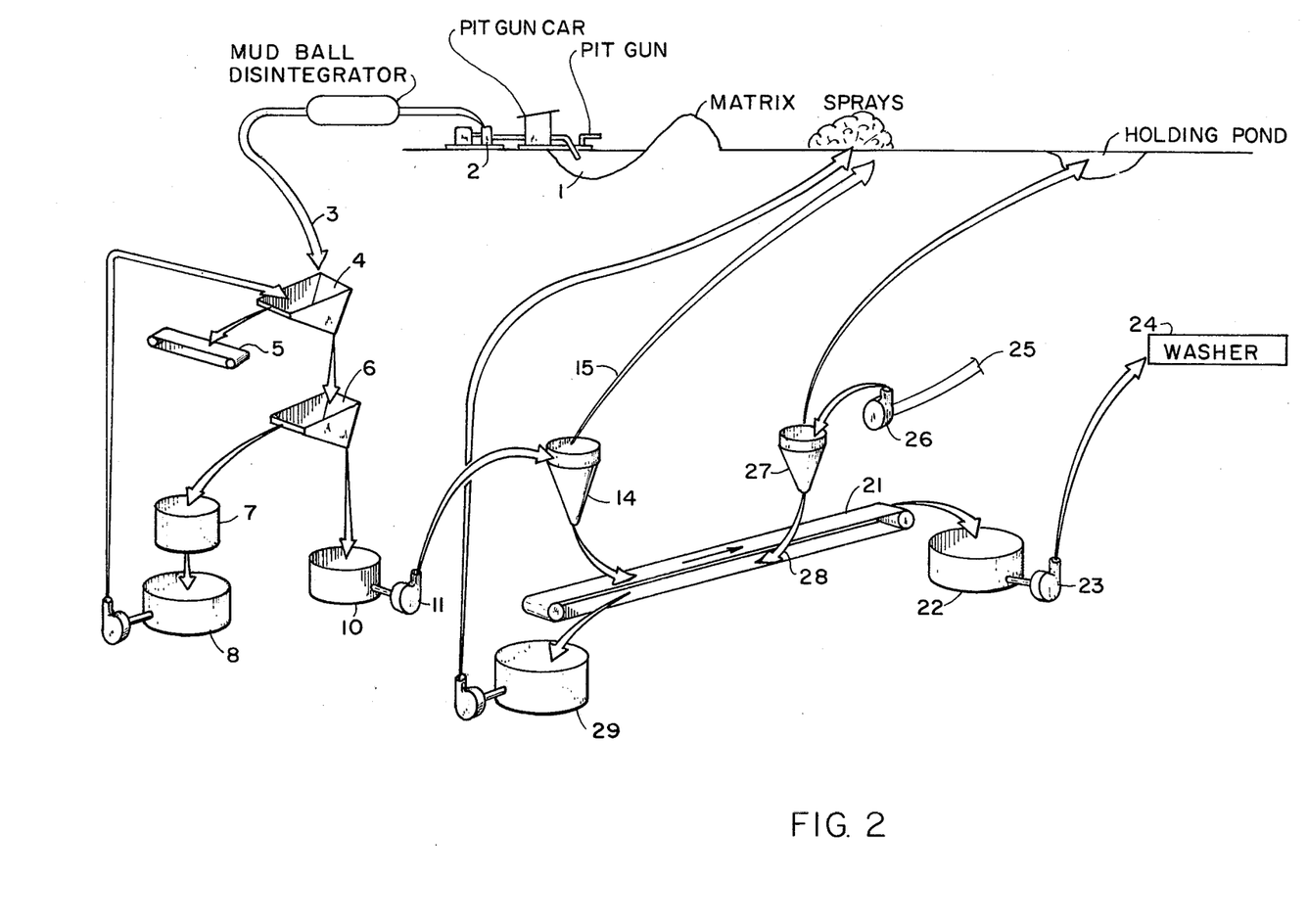
FIG. 2 is a diagrammatic sketch of a preferred process of this invention especially designed for the treatment of phosphate ores which contain substantial quantities of compacted clays (mudballs) in which phosphate values are entrapped.

FIG. 2 illustrates a variation of the ore processing method which is especially designed for the treatment of ores found to contain a high percentage of mudballs. This method involves mining and treatment of the matrix in about the same manner as described for the process of FIG. 1. The process differs in one material way, and that is installation of a sonic mudball disintegrator in the matrix slurry delivery system, between the pit pump 2 and the grizzly 4. In this process, the matrix slurry 3 from pumps 2 is introduced into a vessel equipped with transducers for generating sonic vibrations at frequencies as high as 100 cycles per second in the slurry to cause compacted clays or mudballs to be broken up or disintegrated, thus freeing entrapped phosphate particles.

Apparatus for generating and transmitting sonic vibrations in liquids, slurries, and the like, are described for example in U.S. Pat. to A. G. Bodine (No. 3,153,530; No. 2,960,317 and No. 3,682,511) and R. O. Speer (No. 3,811,623).

After subjecting the slurry 3 to sonic vibration treatment, the slurry is deposited on the grizzly 4 for scalping off any plus 3-inch material which remains in the slurry; as for example, rocks, wook, and the like. Treatment of the underflow from grizzly 4 is as described with reference to the process of FIG. 1.

While the continuous belt 21 is shown only schematically in FIGS. 1 and 2, FIGS. 3, 4 and 5 are provided to illustrate some details of a continuous belt system preferred in the practice of the present invention.

Figure 4:
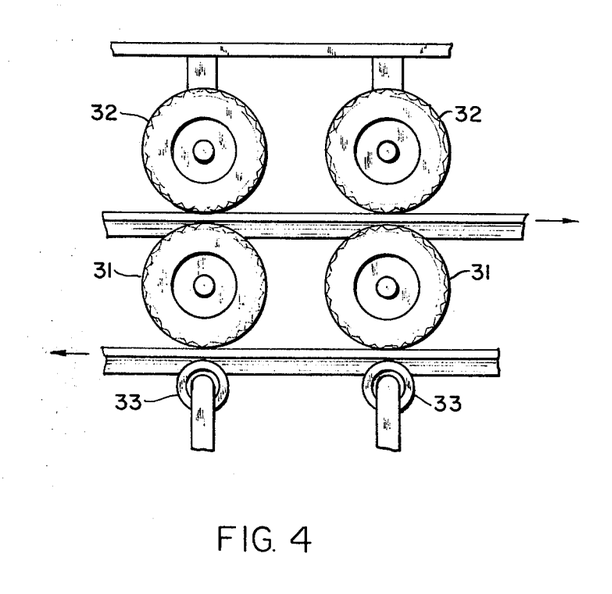
FIG. 4 is a side view of the continuous belt drive module.
Figure 5:
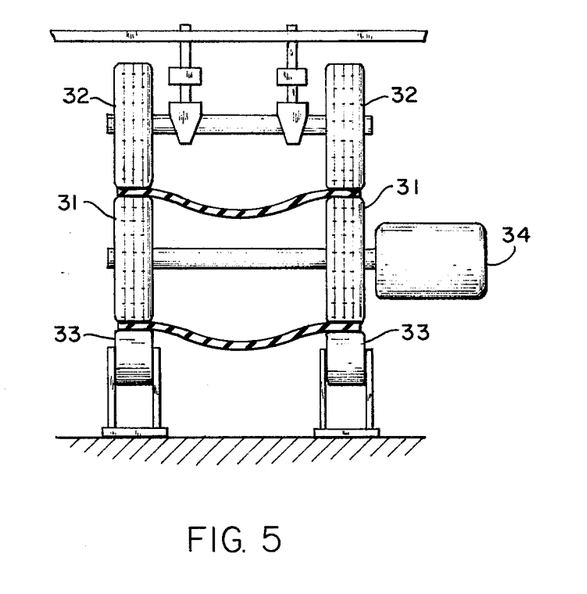
FIG. 5 is a cross-section of the continuous belt drive module.
Figure 6:
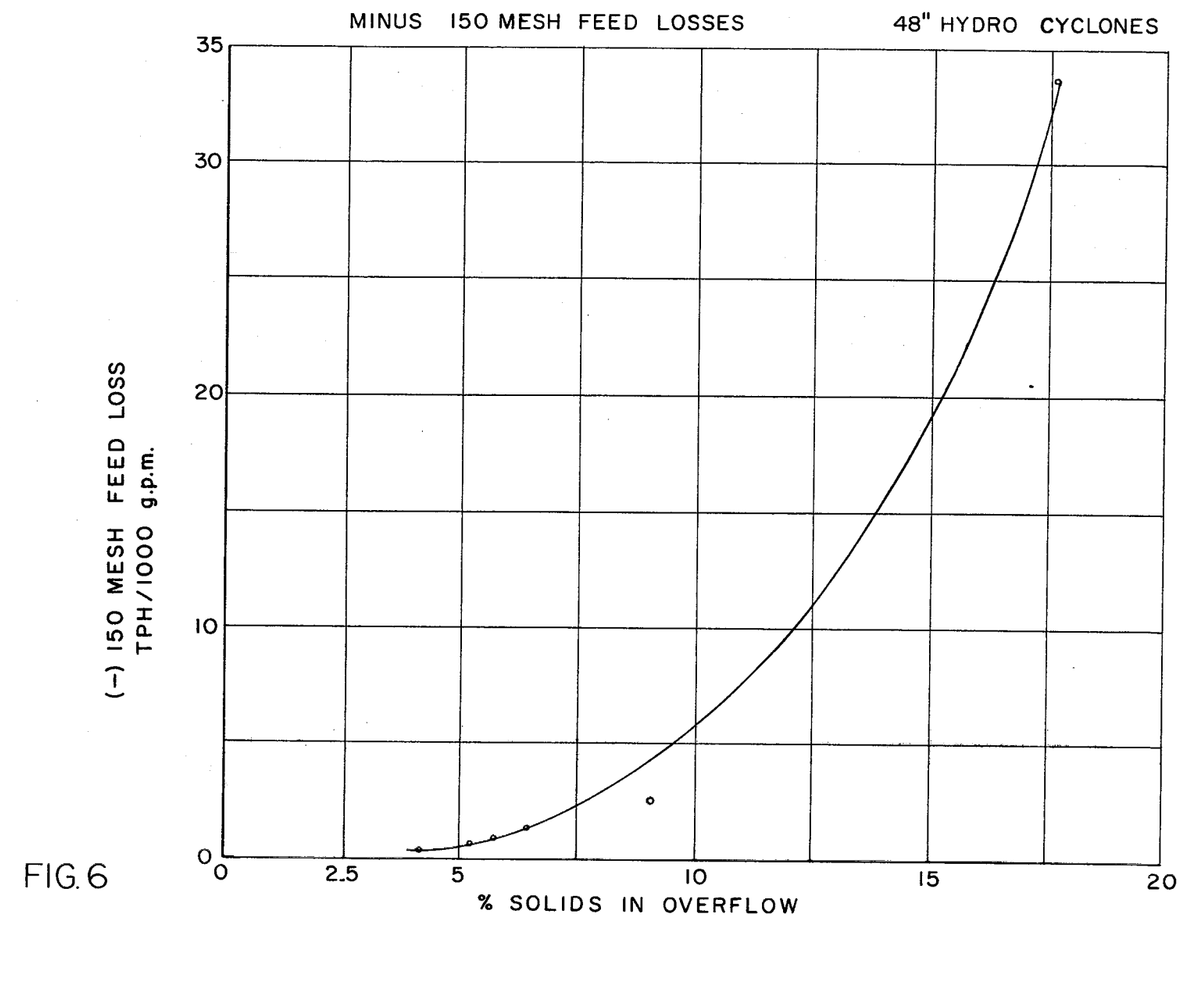
FIG. 6 is a graphic presentation of data tabulated in Table 1.

The system transport between the intermediate station and the ore processing plant comprises a flexible radial steel belt, reinforced longitudinally by steel cables embedded in the edges thereof. Power is transmitted to the belt by pneumatic tires working in pairs at the drive modules. Each drive module employs two pairs of drive wheels 31, one pair disposed at either edge of the radial steel belt, two pairs of free-wheeling pressure tires 32 disposed above said drive wheels on the opposite side of the upper strand of the belt, and two pairs of rubber-covered pressure rolls 33 disposed under said drive wheels, below the lower strand of the belt. The tires squeeze the edges of the belt, and as they turn the belt moves forward. The return strand of the belt is similarly powered as it is squeezed between the drive tires and the rubber-covered pressure rolls. Thus, the driving force applied at each module to both the primary belt and the return strand is uniform and synchronized.

Drive modules are spaced, as needed, along the length of the belt, and power for operating each drive module is furnished by a relatively low horsepower electric motor 34 at each module.

Figure 3:
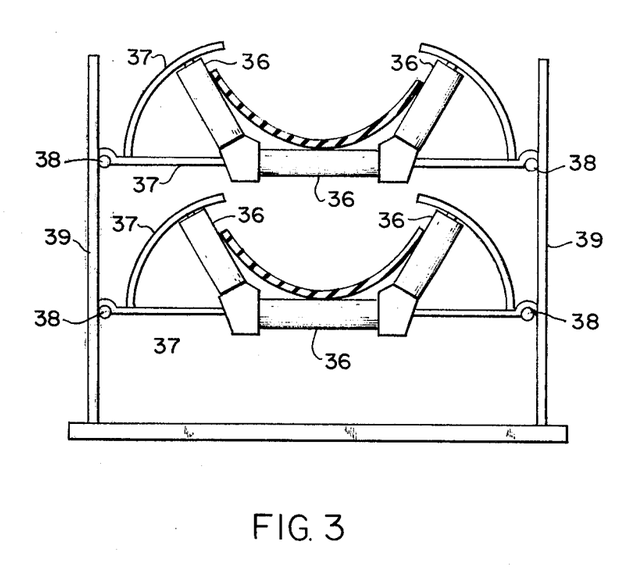
FIG. 3 is a cross-sectional view of the idler support system for the continuous belt.

Between the drive modules, the belt is supported by several suspended idler support units (FIG. 3), spaced as needed along the length of the belt. Each idler unit comprises rollers 36 mounted in a frame 37 which is suspended at either end by cable means 38 mounted on adjustable supports 39. Each idler unit is equipped with a central support roller which supports the center of the belt and with two adjustable side or trough rollers which can be elevated as shown in FIG. 3 to support the sides of the belt and to form the belt into a "U"-shaped trough. The adjustable side rollers lend flexibility to the conveyor system. They can be lowered to permit flattening of the belt at selected locations. As indicated previously this arrangement is particularly advantageous for handling wet matrix, since it permits water which separates from the matrix while in transit to be drained from the belt.

In practice, the return strand of the belt is carried by similar idler supports, and when it is used to return wet tailings the same technique of flattening the lower section of the belt can be used to drain excess water which separates from wet trailings on the belt.

Also, in practice we have found it essential when using the intermediate conveyor system for the simultaneous transport of both matrix and tailings, to use the same surface of the belt in contact with both materials. This is achieved by providing means for twisting the return strand at each end of the conveyor system. The flexible belt is passed downward around horizontal rolls at the matrix discharge end of the system to reverse the direction of the belt. Before the lower section reaches the point for loading on tailings, the belt is twisted 90° onto vertical rolls, and then twisted another 90° onto horizontal rolls to complete a 180° twist at the beginning of the lower section. This procedure is reversed at the beginning of the upper section before the upper section reaches the matrix loading point at the mine area.

EXAMPLE 1

Two 48-inch cyclones having 10-inch apex openings are used in tests to determine feed solids concentrations and feed pressures required to achieve satisfactory desliming and dewatering of phosphate matrix slurry from the mine by the cyclones. In these tests, the cyclones are operated at 50 and 70 psi. feed pressures. At 50 psi. the slurry feed rate to the cyclones is maintained at about 10,000 gallons per minute, and at 70 psi. the feed rate is about 13,000 gallons per minute.

The solids concentration in the cyclone feed is varied between about 15% and 35% solids, and determinations of solids content are determined for both overflow and underflow at all pressures and solids concentrations. Data obtained are tabulated in Table 1. The tests indicate that solids concentration in the slurry feed to the cyclone should be maintained between about 20% and 30% in order to obtain a dewatered-deslimed matrix having a solids concentration between about 65% to 77%. Matrix from these tests was deposited on the continuous belt, shown as 21 in FIG. 1, and transported to the reslurry tank 22. Matrix having less than 65% solids when transported on the belt caused splash and deposition problems in loading the belt and washouts during belt transport up a 3% grade; whereas, matrix having 65% or more solids was satisfactorily deposited on the belt and transported to the reslurry tank.

TABLE I

Matrix Cyclone Test
(Two 48-Inch Cyclones at 50 psi.)
(10-Inch Apex Opening) (Feed Rate 10,000 gpm)

| Test | $\Delta P$ at Entry | % Solids (Feed) | Overflow % Solids | Overflow Losses TPH +150-mesh per 1000 gpm | Under-Flow % Solids | Remarks |
|---|---|---|---|---|---|---|
| A | 50 psi. | 15 | 4.4 | 0.1 | 57 | Underflow Solids to low |
| B | 50 psi. | 20 | 6.0 | 0.3 | 65 | ↑ |
| C | 50 psi. | 25 | 8.1 | 0.5 | 75 | Operating |
| D | 50 psi. | 25 | 8.1 | 0.5 | 75 | Range |
| E | 50 psi. | 30 | 10.0 | 1.2 | 76 | ↓ |
| F | 50 psi. | 35 | 20.0 | 24.0 | 77 | Cyclone Choking |
| G | 70 psi. | 15 | 4.8 | 0.1 | 59 | Underflow Solids to low |
| H | 70 psi. | 20 | 6.9 | 0.2 | 66 | |
| I | 70 psi. | 25 | 8.5 | 0.7 | 76 | Operating |
| J | 70 psi. | 25 | 8.5 | 0.7 | 76 | Range |
| K | 70 psi. | 30 | 10.6 | 2.5 | 77 | |
| L | 70 psi. | 35 | 20.0 | 30.0 | 77 | Cyclone Overloaded |

EXAMPLE 2

Sonic Mudball Disintegration Tests

The purpose of the test was to demonstrate the use of vibration or sound vibration to break up clay mudballs in phosphate pebble.

Sonic Unit

Standard Bodine sound drive unit driven by a 25 HP motor, coupled to a $5\frac{1}{4}$ inches inside diameter pipe approximately 4 feet long. Amplitude and cycles were variable but run at 96 cycles per second at the amplitude chosen by the operator. Fractional horsepower (1 HP) was required for the tests, but the unit is equipped with a large motor for other laboratory test purposes.

Procedure

Mixtures of plus 3-inch mudballs and muddy pebble from actual phosphate ore slurries [supplied by Brewster] were prepared as shown below. This mixture was placed in the $5\frac{1}{4}$ inches ID tube and sonically vibrated for the time shown. After treatment the sample was removed and examined for clay mudballs. In test 8, a $4\frac{1}{4}$ inches OD steel insert (carrot) was added with the feed sample. In test 9, a $3\frac{1}{2}$ inches OD steel insert was added with the feed sample. In tests 6, 7, 10, 11 and 12, a $4\frac{1}{4}$ inches diameter steel insert was added inside the the tube with the feed. The sound drive was turned on and run for the time shown.

Conclusions

1. Clay mudballs can be dispersed in water by exposure to sonic vibrations.
2. Ten seconds exposure is required for 70–80% dispersion of mudballs with a $4\frac{1}{4}$ inches diameter insert.
3. Twenty seconds exposure is required for complete dispersion of mudballs with a $4\frac{1}{4}$ inches diameter insert.
4. Ten seconds exposure is required for complete dispersion of mudballs with a $4\frac{1}{4}$ inches insert when an equal amount of fine feed is added.
5. Sufficient water is required — not over 66% — to disperse the clay.

Data obtained are reported in Table II below.

TABLE II

| Test Number | Feed Mixture | % Solids | Sample Size | Time Exposed | Cycles per Second | Observations |
|---|---|---|---|---|---|---|
| 1 | 5 lbs Muddy Pebble 1 lb Mudballs | 35 | | 2 | | 25% of mudballs dispersed |
| 2 | 1 lb Mudballs | 35 | | 5 | | 50% of mudballs dispersed |
| 3 | 1 lb Mudballs | 35 | | 10 | | 75% of mudballs dispersed |
| 4 | 1 lb Mudballs | 35 | | 20 | | 90% of mudballs dispersed |
| 5 | 5 lbs Mudballs | 80 | 5 lbs | 20 | 96 | One-half mudballs crushed; water needed for dispersion |
| 6 | 22 lbs Muddy Pebble 3 lbs Mudballs | 50 | 25 lbs | 10 | 96 | Overloaded tube; water not dispersed |
| 7 | 3 lbs Mudballs | 50 | 25 lbs | 20 | 96 | Overloaded tube; water not dispersed |
| 8 | $4\frac{1}{2}$ lbs Muddy Pebble $\frac{1}{2}$ lb Mudballs | 35 | 5 lbs | 10 | 96 | Crushed pebble and mud |
| 9 | $4\frac{1}{2}$ lbs Muddy Pebble $\frac{1}{2}$ Mudballs | 35 | 5 lbs | 10 | 96 | One-half mudballs dipsersed |
| 10 | $4\frac{1}{2}$ lbs Muddy Pebble $\frac{1}{2}$ lb Mudballs | 35 | 5 lbs | 10 | 96 | Three-quarters mudballs dispersed |
| 11 | $4\frac{1}{2}$ lbs Muddy Pebble $\frac{1}{2}$ lb Mudballs | 35 | 5 lbs | 20 | 96 | All mudballs dispersed |
| 12 | $1\frac{1}{2}$ lbs Muddy Pebble $1\frac{1}{2}$ lbs Crushed Pebble $\frac{1}{2}$ lb Mudballs | 35 | $3\frac{1}{2}$ lbs | 10 | 96 | All mudballs dispersed |

We claim:

1. A method for processing ore matrix containing in addition to desirable mineral values, substantial quantities of contaminating argillaceous material and silica; comprising, the steps of subjecting said matrix at the mining site to a stream of high pressure water to form said matrix into an aqueous matrix slurry which contains from 20% to 30% solids; transporting said slurry by pipeline to an intermediate station in the vicinity of the mining site and while at said station separating plus 3-inch solids from said matrix slurry, reducing the size of essentially all of the remaining minus 3-inch, plus ¾-inch solids in said matrix slurry to minus ¾-inch particle size, subjecting the thus-formed slurry to dewatering and desliming treatment whereby the solids content is increased to at least about 65% solids and aqueous slime is removed which contains no more than about 12% by wt solids and depositing the dewatered deslimed matrix on a continuous belt for transport, transporting the dewatered and deslimed matrix by continuous belt over an extended distance from said station to an ore dressing plant for refining of said mineral values.

2. A method defined by claim 1, wherein the ore matrix is phosphate rock ore.

3. A method defined by claim 2, wherein aqueous slimes removed by the desliming treatment are deposited in a waste disposal area near or adjacent the site where the ore matrix is mined.

4. A method defined by claim 3, wherein dewatered silica tailings from the ore dressing plant are transported on the return strand of the same defined continuous belt, to the intermediate station defined in claim 1.

5. A method according to claim 4, wherein said silica tailings are slurried with water at the intermediate station, transported by a slurry pipeline to said waste disposal area and sprayed over settled slimes in the waste disposal area.

6. A method according to claim 1, wherein the matrix slurry is subjected to ultrasonic vibrations in the frequency range of from 300,000 to 1,200,000 cycles per second prior to the defined separation of plus 3-inch solids.

7. A method defined by claim 1, wherein dewatering and desliming of the matrix slurry is carried out by means of a cyclone separator operated at sufficient feed pressure that the overflow from said cyclone separator contains less than about 10% solids by weight (dry basis).

8. A method defined by claim 7, wherein said cyclone is operated with a feed pressure of from about 50 psig. to about 80 psig.

* * * * *